US007962645B2

(12) United States Patent
Dain et al.

(10) Patent No.: US 7,962,645 B2
(45) Date of Patent: Jun. 14, 2011

(54) APPARATUS, SYSTEM, AND METHOD FOR AUTOMATICALLY MAPPING A TAPE LIBRARY SYSTEM

(75) Inventors: Joseph Whitney Dain, Tucson, AZ (US); James Arthur Fisher, Tucson, AZ (US); Raymond Anthony James, Tucson, AZ (US); David Luciani, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 11/047,050

(22) Filed: Jan. 31, 2005

(65) Prior Publication Data

US 2006/0174036 A1   Aug. 3, 2006

(51) Int. Cl.
*G06F 15/16* (2006.01)
*G06F 15/173* (2006.01)
*G06F 13/00* (2006.01)
*G06F 9/26* (2006.01)
*G11B 19/02* (2006.01)
*G11B 15/68* (2006.01)

(52) U.S. Cl. ........ 709/238; 709/224; 709/226; 709/245; 711/4; 711/111; 711/114; 711/162; 711/202; 360/69; 360/71; 360/92.1

(58) Field of Classification Search .................. 709/224, 709/226, 238, 245; 711/4, 111, 114, 162, 711/202; 360/69, 71, 92.1
See application file for complete search history.

(56) References Cited

U.S. PATENT DOCUMENTS

| | | | | |
|---|---|---|---|---|
| 5,570,358 A * | 10/1996 | Alatalo et al. | | 370/378 |
| 5,890,633 A * | 4/1999 | Skillin et al. | | 222/523 |
| 5,892,633 A * | 4/1999 | Ayres et al. | | 360/73.08 |
| 5,925,119 A * | 7/1999 | Maroney | | 710/315 |
| 6,154,790 A * | 11/2000 | Pruett et al. | | 710/15 |
| 6,286,061 B1 * | 9/2001 | Ross | | 710/33 |
| 6,286,078 B1 * | 9/2001 | Fuld | | 711/111 |
| 6,604,165 B1 * | 8/2003 | Terao | | 711/5 |
| 6,625,732 B1 * | 9/2003 | Weirauch et al. | | 726/26 |
| 6,725,394 B1 * | 4/2004 | Bolt | | 714/7 |
| 6,842,841 B1 * | 1/2005 | Kuik et al. | | 711/111 |
| 6,917,626 B1 * | 7/2005 | Duvvury | | 370/466 |
| 6,971,044 B2 * | 11/2005 | Geng et al. | | 714/11 |
| 7,062,614 B2 * | 6/2006 | Camble et al. | | 711/152 |
| 7,082,497 B2 * | 7/2006 | Slater et al. | | 711/114 |
| 7,116,506 B1 * | 10/2006 | Mojica | | 360/71 |
| 7,197,556 B1 * | 3/2007 | Short et al. | | 709/224 |
| 7,363,425 B2 * | 4/2008 | Camble et al. | | 711/114 |
| 7,603,386 B2 * | 10/2009 | Amarendran et al. | | 1/1 |
| 2002/0169903 A1 * | 11/2002 | McIntosh et al. | | 710/100 |
| 2004/0246957 A1 * | 12/2004 | Grimminger | | 370/389 |
| 2005/0177268 A1 * | 8/2005 | Morinaga et al. | | 700/121 |
| 2005/0207414 A1 * | 9/2005 | Duvvury | | 370/389 |

* cited by examiner

FOREIGN PATENT DOCUMENTS

WO    WO 0145103 A1 *  6/2001

*Primary Examiner* — Shawki S Ismail
*Assistant Examiner* — Farzana Huq
(74) *Attorney, Agent, or Firm* — Kunzler Needham Massey & Thorpe

(57) ABSTRACT

An apparatus, system, and method are disclosed for automatically and transparently mapping tape drives within tape libraries to IP addresses. In one embodiment, the tape library includes, a DHCP server, a LAN to serial switch, and a library manager configured with the necessary modules to map the tape library devices to the proper IP addresses. The entire process may be transparent to users. The result is that the tape library is configured with the proper IP addressing without costly, time-consuming, and error-prone manual intervention. The tape library can be configured more quickly with accurate IP addressing and is able to operate efficiently and properly.

22 Claims, 4 Drawing Sheets

APPARATUS, SYSTEM, AND METHOD FOR AUTOMATICALLY MAPPING A TAPE LIBRARY SYSTEM

BACKGROUND OF THE INVENTION

1. Field of the Invention

This invention relates to the mapping of tape library systems and more particularly relates to automatically assigning IP addresses to library frames without human intervention.

2. Description of the Related Art

Tape libraries are a popular solution for storing large amounts of information in data processing environments. Tape libraries consist of library frames with physical slots configured to hold tape drives. The tape drives use tape cartridges that may be automatically loaded by robotic devices. In order to handle the huge amounts of information that the current systems must hold, conventional tape libraries have networked library frames attached to a server known as a library manager. A tape library with networked library frames is referred to herein as a networked tape library.

In order for the library manager to function and manage the tape library properly, the library manager should be able to communicate effectively with the devices in the library frames. In a network, this means that the library manager needs to know what the nature of the various components in each frame as well as their network addresses.

In many systems, initiating a library manager with the networked tape library components involves manual identification of the various library components and their addresses on a series of panels or screens. Specialists are often called in to assist. Unfortunately, such a teaching method is time-consuming and prone to human error. Errors in entering the various components and their addresses result in incorrect configuration information and ineffective communication with the devices within the library frames.

One of the major problems with conventional networked tape libraries is assigning a unique IP address to the serial switches or hubs within each frame. One current method involves manually entering the Media Access Control (MAC) addresses on panels attached to the device. Under this method the user first computes the desired Internet Protocol (IP) address, which is typically based on frame location or some other unique identifier. The user then records the MAC address of each switch or hub associated with a library frame. In certain cases, a computer may be attached to each switch or hub in order to enter the MAC address and IP address of each device into an Address Resolution Protocol (ARP) table. After users have entered the configuration information into the ARP table, the user may ping each switch or hub with the newly assigned IP addresses to ensure that the devices are communicating correctly. Another current method entails attaching a laptop or computer to the switch or hub through one of the serial ports and using the built in software provided on the switch or hub to assign an IP address. A further method includes attaching a DHCP server to the library manager to assign the IP addresses of the switch or hub devices.

An undesirable result of the currently available approaches is an increased cost and expense associated with managing tape libraries. Additionally, each of the conventional methods is subject to human interaction, manual data entry, and human error. If a user accidentally enters a wrong digit in either the MAC or the IP address, network communications will be improperly routed, and the tape library will not operate correctly. Fixing these errors demands additional diagnosis and time. Additional delays and expense may also occur if a specialist must be dispatched on site to configure the tape library.

From the foregoing discussion, it should be apparent that a need exists for an apparatus, system, and method that would eliminate human interaction and human error by automatically mapping a tape library to the correct IP addressing, The apparatus, system and method would reduce the need for users to manually enter data.

Beneficially, such an apparatus, system, and method would reduce the amount of misrouted and dropped packets due to human error in initializing the networked tape library with information about the tape library's components. In addition, such an apparatus, system, and method would configure a networked tape library more easily and quickly than a user could by manually entering data.

SUMMARY OF THE INVENTION

The present invention has been developed in response to the present state of the art, and in particular, in response to the problems and needs in the art that have not yet been fully solved by currently available technology for assigning IP addresses within a networked tape library. Accordingly, the present invention has been developed to provide an apparatus, system, and method for automatically and transparently ensuring consistent addressing in a tape library that overcomes many or all of the above-discussed shortcomings in the art.

The apparatus, system and method of the present invention for automatically mapping a tape library to IP addresses in certain embodiments eliminates the need to send a costly specialist on site to configure the tape library. The apparatus, system and method are also transparent to the user, eliminating the need for users to know the mapping strategy and IP addresses assigned to each device. The apparatus, system and method also prevent incorrect address assignment and address conflicts in the tape library. In addition, the tape library is configured more quickly and easily for the user.

In one aspect of the present invention, a method for automatically mapping a tape library system includes establishing communication with a device within an unidentified frame, the unidentified frame having a MAC address associated therewith; extracting sufficient characteristics from the device to distinguish the frame from other frames; and associating a persistent IP address with the MAC address.

A variety of techniques may be individually or collectively employed to distinguish a frame from other frames. In certain embodiments, these techniques include determining a device type, determining a device model number, and determining a physical location of the device. The techniques may also include communicating with a plurality of devices to determine a device quantity and seeking for a termination device within a frame. In certain embodiments, establishing communication involves associating a temporary IP address with a hub or switch within a frame which is subsequently changed to a persistent IP address.

In another aspect of the present invention, an apparatus for automatically mapping a tape library system includes a communication module configured to establish communication with a device within an unidentified frame, an identification module configured to extract sufficient characteristics from the device to distinguish the frame from other frames, and an IP address assignment module configured to associate a persistent IP address with the MAC address.

The identification module may be configured to extract a variety of characteristics such as device type, device model number, device quantity, and physical location of the device. In one embodiment, the identification module prioritizes the characteristics and extracts the characteristics in order of priority until sufficient characteristics are determined to distinguish the frame from other frames. The IP address assignment module may assign a temporary IP address to a hub or switch associated with the unidentified frame, and subsequently assign a persistent IP address once the frame is distinguished from other frames.

In another aspect of the present invention, a system for automatically mapping a tape library system may include a library manager configured to execute the aforementioned method in conjunction with one or more robotic devices configured to mount a cartridge in a drive, and a DHCP server configured to assign IP addresses.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention. These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
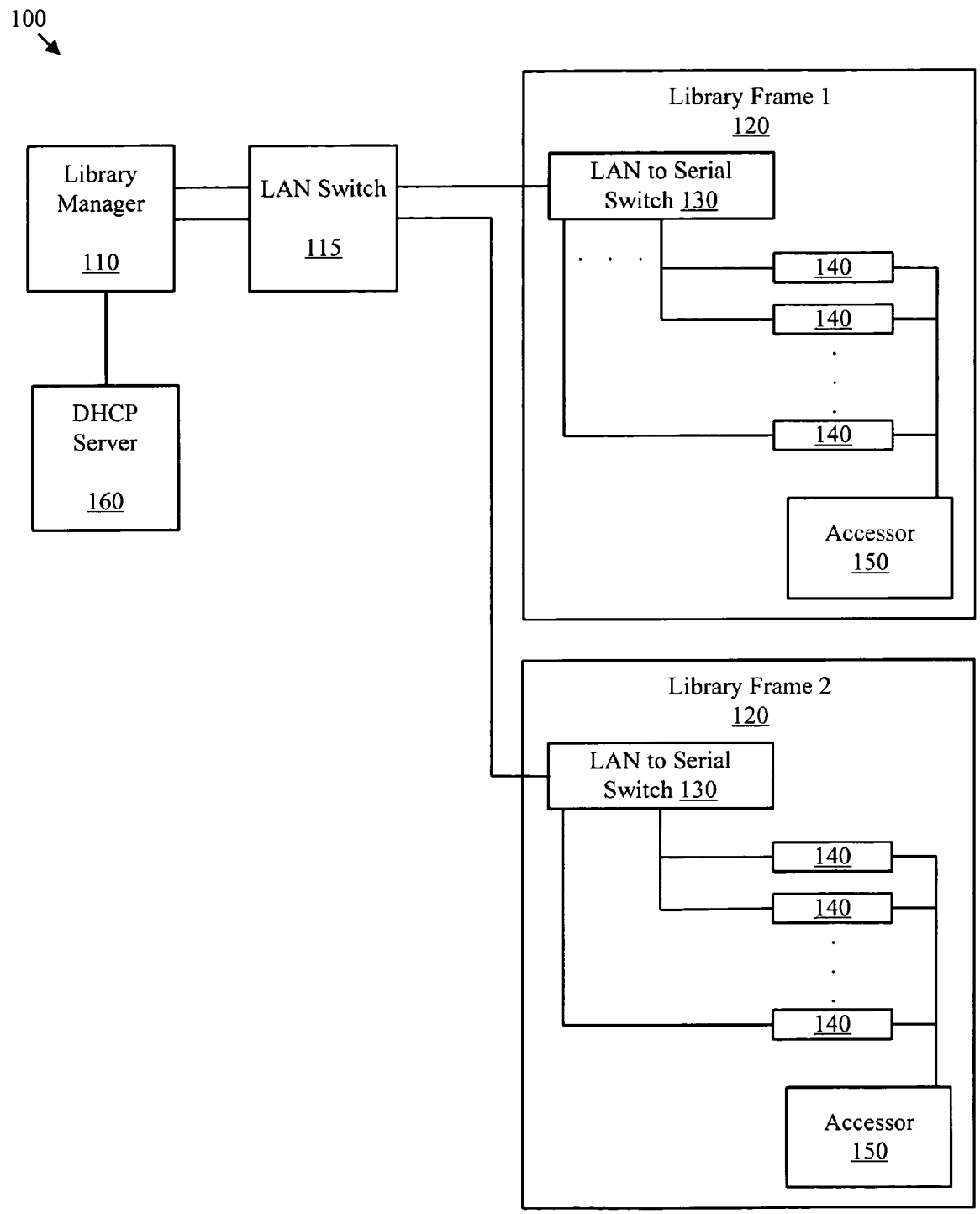
FIG. 1 is a block diagram depicting one embodiment of an automatic tape library mapping system of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a block diagram depicting one embodiment of an automatic tape library mapping system 100 of the present invention. As depicted, the automatic tape library mapping system 100 includes a library manager 110, one or more LAN switches 115, one or more library frames 120, one or more LAN to serial switches 130, multiple tape drives 140, one or more accessors 150, and one or more DHCP servers 160. In one embodiment the automatic tape library mapping system 100 uses duplicate components to provide system redundancy and reliability. The automatic tape library mapping system 100 facilitates accurate assignment of IP addresses to the LAN to serial switches 130 without requiring manual intervention.

The library manager 110 manages the frames 120. Each library frame 120 may include one or more LAN to serial switches 130, tape drives 140, and an accessor 150. The library manager 110 communicates with a network of library frames 120 in order to manage the tape drives 140. Although, the depicted embodiment includes only one library manager 110, an alternate embodiment may include more than one library manager 110.

As depicted in FIG. 1, the LAN switch 115 communicates between the library manager 110 and the LAN to serial switches 130. The LAN switch 115 may be an optional component. In one embodiment, the LAN switch 115 provides greater bandwidth between the LAN to serial switches 130 incorporated in the automatic tape library mapping system 100. In another embodiment, the LAN switch 115 provides redundancy and fault tolerance as it communicates between redundant library components. In another embodiment, the automatic tape library mapping system 100 operates without the LAN switch 115.

The library frame 120 is a hardware frame with physical slots that hold the tape drives 140. For example, a particular library frame 120 may hold up to 16 tape drives 140. The depicted library frame 120 also includes a LAN to serial switch 130. In another embodiment, the LAN to serial switch 130 could be located remotely from the library frame 120 and in operable communication with the tape drives 140 inside of the library frame.

In one embodiment, the LAN to serial switch 130 converts the incoming LAN protocol to a serial protocol used by the tape drives 140 in the library frame 120. The depicted LAN to serial switch 130 is configured with 16 ports with each port connected to a tape drive 140. To ensure reliable communication, each LAN to serial switch 130 in the tape library must have a unique IP address. The depicted embodiment shows one LAN to serial switch 130 in each library frame 120. An additional embodiment incorporates additional LAN to serial switches 130. Another additional embodiment incorporates an additional DHCP server 160 and additional LAN switches 115.

The tape drives 140 may be placed into slots inside of the library frame 120. In certain embodiments, each library frame 120 may house only one type of tape drive 140. Housing only one type of tape drive 140 reduces the complexity of managing the library frames 120.

The accessor 150 is a robotic device associated with the library frames 120. In one embodiment, a single accessor 150 services all of the frames. In another embodiment, multiple accessors 150 associated with each frame function as a coordinated unit. In another embodiment, each frame contains a dedicated accessor 150 that operates independent of the other accessors 150. The accessor 150 may be configured with the port number and (x,y,z) location of each tape drive. The accessor 150 can thus load a tape cartridge into a specified tape drive 140 eliminating the need for manual tape cartridge insertion.

FIG. 1 also depicts a DHCP server 160. The depicted DHCP server 160 is configured to assign IP addresses to the LAN to serial switches 130. After the LAN to serial switch 130 has been assigned an IP address, the library manager 110 can communicate with and manage the tape library.

Figure 2:
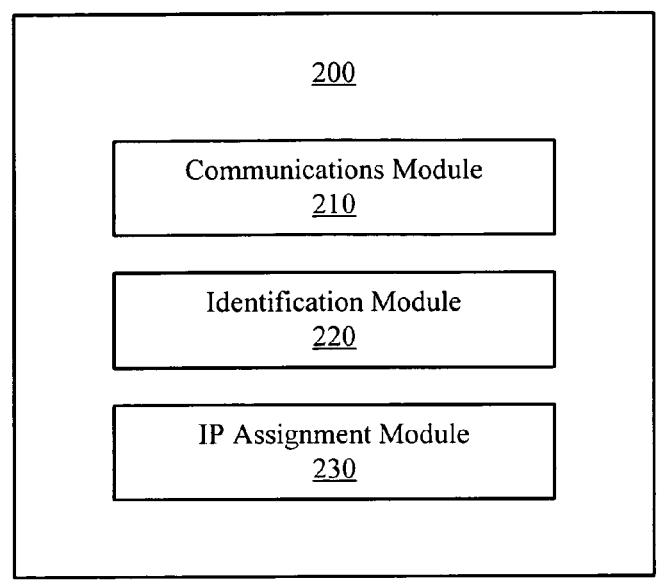
FIG. 2 is a block diagram depicting one embodiment of an automatic tape library mapping apparatus of the present invention.

FIG. 2 is a block diagram depicting one embodiment of the automatic tape library mapping apparatus 200 of the present invention. The automatic tape library mapping apparatus is one embodiment of the library manager 110 depicted in FIG. 1. As depicted, the automatic tape library mapping apparatus 200 includes a communications module 210, an identification module 220, and an IP assignment module 230. Beneficially, the automatic tape library mapping apparatus eliminates human intervention in the mapping process, ensuring accurate IP addressing.

As depicted in FIG. 2, the tape library mapping apparatus contains a communication module 210. The library manager 110 communicates with the tape library system. In order to do so, each LAN to serial switch 130 must have a unique IP address. The communications module establishes temporary communication between the library manager and the LAN to serial switch 130 so that the DHCP server 160 can assign the LAN to serial switch 130 a unique IP address. Once initial communication is established, the library manager 110 is able to communicate all the way through the LAN to serial switch 130 to the tape drives 140. The library manager 110 then sends a message to the tape drive 140 inquiring what type of drive it is.

The identification module 220 depicted in FIG. 2 determines the type, number and (x,y,z) coordinates of tape drives 140 contained within each library frame 120. If the identification module 220 cannot identify the LAN to serial switch and the frame it is associated with by the type drive type information contained in the response message, the identification module 220 listens for the exact message sent by the communication module 210 to be echoed back by a loop back plug. Once the identification module 220 receives the exact message, the identification module 220 determines how many tape drives 140 are in the frame. If the identification module 220 still cannot identify which frame and, thus, which LAN to serial switch it is talking to, the accessor 150 mounts a tape cartridge in one of the tape drives. Once the identification module 220 receives the return message from the tape drive after the cartridge is mounted, the identification module 220 can determine the (x,y,z) coordinate of the tape drive to identify the frame and the LAN to serial switch.

As depicted in FIG. 2, the IP address assignment module 230 uses the identification information given to it by the identification module 220 to assign the LAN to serial switch the correct IP address. In this manner, the tape library mapping apparatus is able to accurately determine the correct IP address of the LAN to serial switch without user intervention. Beneficially, this prevents having to send a specialist on site to determine the IP addresses and also prevents human error.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
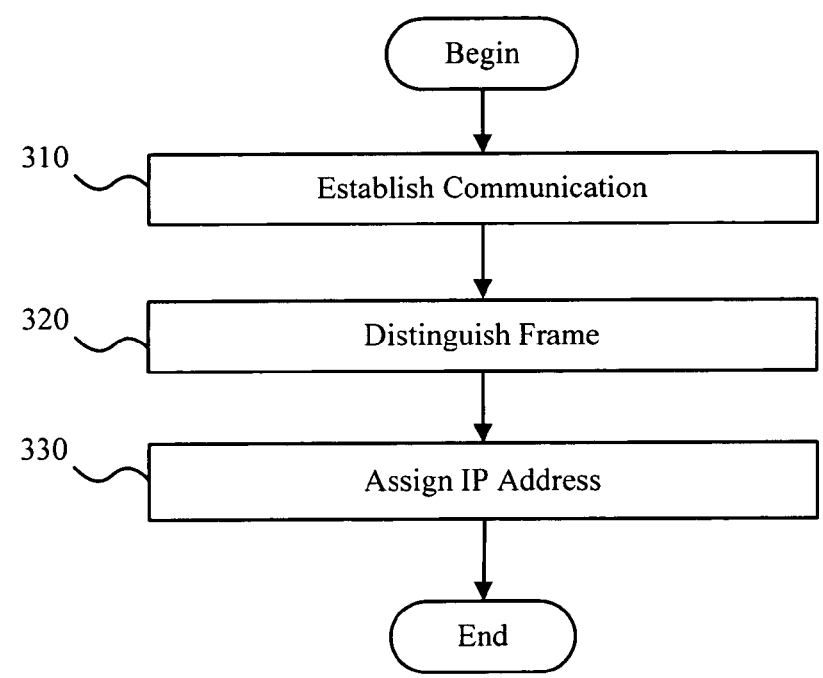
FIG. 3 is a flow chart diagram depicting one embodiment of an automatic tape library mapping method of the present invention.

FIG. 3 is a flow chart diagram depicting one embodiment of the automatic tape library mapping method 300 of the present invention. As depicted, the automatic tape library mapping method 300 includes an establish communication operation 310, a distinguish frame operation 320, and an assign IP address operation 330. The automatic tape library mapping method 300 facilitates accurately assigning IP addresses to LAN to serial switches without human intervention.

As depicted in FIG. 3, the establish communication operation 310 establishes temporary communication between the library manager 110 and the LAN to serial switch 130 so that the assign IP address operation 330 can assign the LAN to serial switch 130 a unique IP address. When the library frame 120 is first powered on, it goes through a DHCP discovery process. To enable temporary communication among the DHCP server 160, the library manager 110, and the library frame 120 the establish communication operation 310 uses the MAC address of the LAN to serial switch 240 and an IP address correlation, such as the library frame's 120 physical location, to assign a temporary IP address in order to start communication. Once initial communication is established, the library manager 110 is able to communicate all the way through the LAN to serial switch 130 to the tape drives 140. The library manager 110 then sends a message to the tape drive 140 inquiring what type of drive it is.

One embodiment of the distinguish frame operation 320 depicted in FIG. 3 determines the type, number and (x,y,z) coordinates of tape drives 140 contained within each library frame 120. For example, the first attempt to distinguish the library frame 120 from the other library frames 120 may be to determine the type of tape drive 140 the library frame 120 contains. If only one library frame 120 is holding the tape drive 140 type returned in the message, the distinguish frame operation 320 can identify the library frame and proceeds to the assign IP address operation 330. However, if more than one library frame 120 is holding that type of tape drive 140, the distinguish frame operation 320 may needs more information. In this case, the distinguish frame operation 320 may listen for the exact echo of the message sent from a loop-back plug. Once the distinguish frame operation 320 receives the echo, the distinguish frame operation 320 can determine how many tape drives 140 the library frame 120 contains. If each library frame 120 is holding a different number of tape drives 140, the distinguish frame operation 320 can identify the library frame 120 and proceeds to the assign IP address operation 330.

In some instances, several library frames 120 contain the same type and number of tape drives 140. In such a circumstance, the distinguish frame operation 320 mounts a cartridge in a tape drive 140. Once the distinguish frame operation 320 determines which tape drive 140 has mounted the cartridge, the distinguish frame operation 320 knows the (x,y,z) coordinates of the tape drive 140 and can identify the library frame 120. The distinguish frame operation 320 then proceeds to the assign IP address operation 330.

The assign IP address operation 330 receives the frame identification information from the distinguish frame operation 320. The assign IP address operation 330 then communicates between the DHCP server and the library manager to assign the correct IP address to the LAN to serial switch 130. Once the IP addresses have been correctly assigned, the tape library manager efficiently communicates with and manages the tape library.

Figure 4:
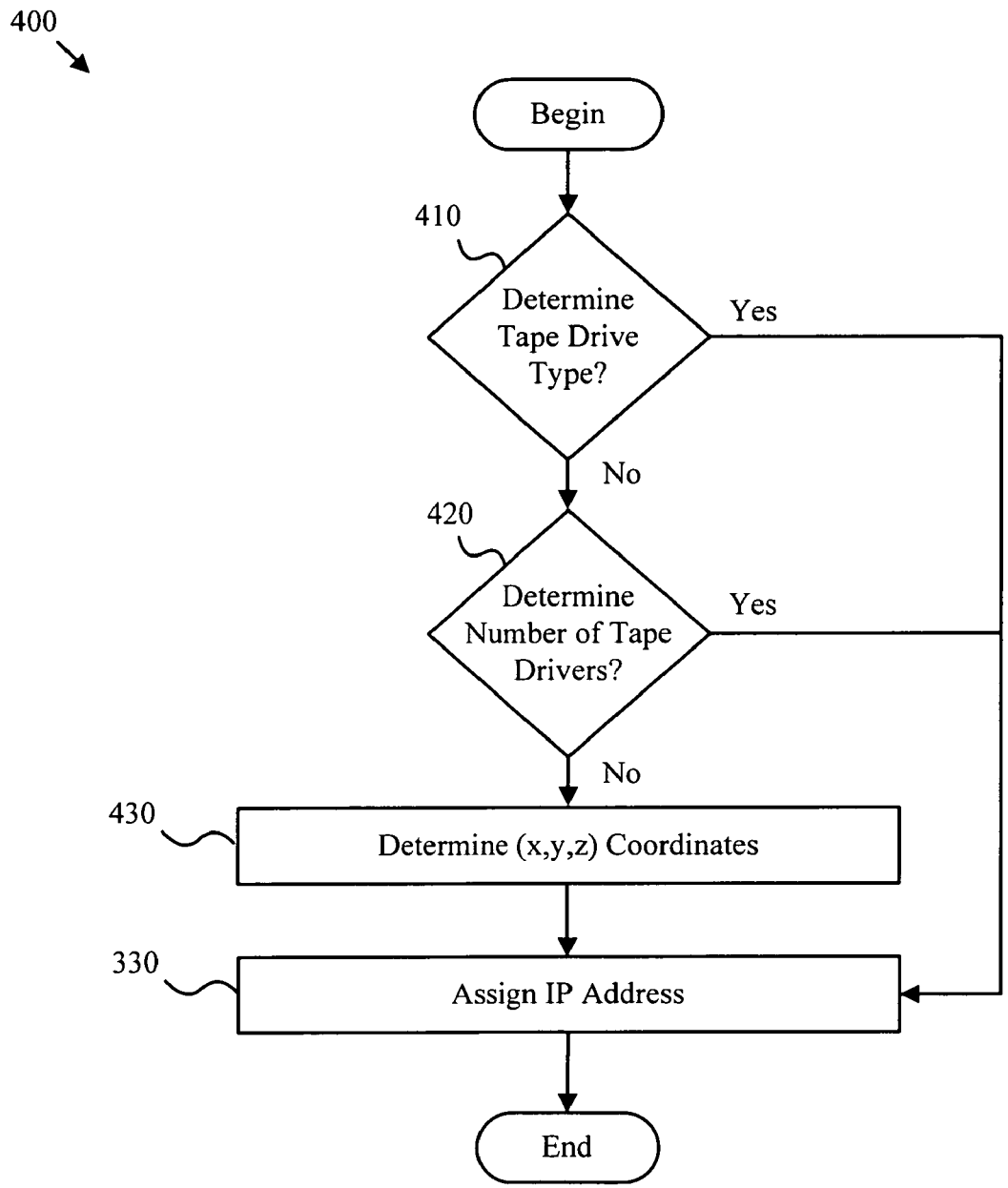
FIG. 4 is a flow chart diagram depicting one embodiment of an identify library frame method of the present invention

FIG. 4 is a flow chart diagram depicting one embodiment of an identify library frame method 400 of the present invention. The method 400 may be used in one embodiment to accomplish the distinguish frame operation 320 of FIG. 3. As depicted, the identify library frame method 400 contains a determine tape drive type operation 410, a determine number of tape drives operation 420, a determine (x,y,z) coordinates operation 430. The identify library frame method 400 facilitates the automatic identification of a library frame without human intervention. Beneficially, the method 400 enables the automatic assignment of IP address to tape library components without intervention by users.

As depicted in FIG. 4, the determine tape drive type operation 410 attempts to identify the library frame 120 by determining the type of tape drives 140 contained in the library frame 120. Once the tape drives 140 receive the packet from the establish communication operation 310, the tape drives 140 respond with a packet that contains information identifying their drive type. In one embodiment, the drive type information corresponds to a define type contained in the determine tape drive type operation 410. Because all of the tape drives 140 in a library frame 120 are the same type, the determine tape drive type operation 410 can identify the library frame 120 by the type of tape drives 140 it contains. If the tape library has only one library frame 120 with this type of tape drive 140, the determine tape drive type operation 410 can identify the frame and the LAN to serial switch 130 connected to it and proceeds to the assign IP address operation 330. If the determine tape drive type operation 410 cannot identify the library frame 120 by the type of tape drives 140 the library frame 120 contains, the determine tape drive type operation 410 proceeds to the determine number of tape drives operation 420.

The determine number of tape drives operation 420 illustrated in FIG. 4 attempts to identify a library frame 120 by determining the number of tape drives 140 the library frame 120 contains. If the library frames 120 contain different numbers of tape drives 140, the determine number of tape drives operation 420 can use this information to identify the frame. To determine the number of tape drives 140 in a library frame 120, the determine number of tape drives operation 420 listens for the exact message sent in the establish communication operation 310 to be echoed back by a loop back plug. In one embodiment, the loop-back plug is placed in the first empty slot of the library frame 120. This would enable the determine number of tape drives operation 420 to determine how many tape drives 140 are in the library frame 120 by subtracting 1 from the port number the echo was received from. In the event that the $16^{th}$ drive slot returns a device type, the loop-back plug cannot be used. In this special case the determine number of tape drives operation 420 marks the number of drives as 16. If only one library frame 120 holds a specific type and number of tape drives 140, the determine number of tape drives operation 420 can identify the library frame 120 and the LAN to serial switch 130 connected to it and proceeds to the assign IP address operation 330. However, some tape libraries contain identical library frames 120 that hold the same type and number of tape drives 140. In this case, the determine number of tape drives operation 420 proceeds to the determine (x,y,z) coordinates operation 430.

As illustrated by FIG. 4, the determine (x,y,z) coordinates operation 430 identifies the library frame 120 by the (x,y,z) coordinates of one of its tape drive. To do this, the determine (x,y,z) coordinates operation 430 signals the accessor 150 to mount a tape cartridge in one of the possible tape drive 140 (x,y,z) coordinates. The determine (x,y,z) coordinates operation 430 then listens for a tape mounted response from one of the tape drives 140. Once the determine (x,y,z) coordinates operation 430 has received the tape mounted response, it knows the (x,y,z) coordinate of the tape drive 140 that sent it. From this (x,y,z) coordinate, the determine (x,y,z) coordinates operation 430 can identify the frame and the LAN to serial switch connected to that library frame 120. The determine (x,y,z) coordinates operation 430 then proceeds to the assign IP address operation 330.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for automatically mapping a tape library system, the method comprising:
   establishing communication with a device within an unidentified frame in a tape library system, the unidentified frame having a Media Access Control ("MAC") address associated therewith, the unidentified frame comprising a hardware frame holding one or more devices in one or more physical slots;
   distinguishing the unidentified frame by sequentially determining characteristics of devices held in the unidentified frame until characteristics are determined that distinguish the unidentified frame from other frames in the tape library system, the characteristics comprising characteristics that facilitate frame identification including a type of devices held in the unidentified frame and a quantity of devices held in the unidentified frame; and
   associating a persistent IP address with the MAC address in response to distinguishing the unidentified frame.

2. The method of claim 1, wherein the characteristics comprise a physical location of the device in the tape library.

3. The method of claim 1, wherein the characteristics comprise a device model number.

4. The method of claim 1, wherein the characteristics comprise a device type.

5. The method of claim 4, wherein the characteristics comprise a device quantity.

6. The method of claim 1, wherein establishing communication comprises associating a temporary IP address with the frame.

7. The method of claim 1, wherein establishing communication comprises communicating through a hub.

8. The method of claim 1, wherein establishing communication comprises communicating through a LAN switch.

9. The method of claim 7, wherein the MAC address is the MAC address of the hub.

10. The method of claim 1, wherein the device is a tape drive.

11. The method of claim 1, wherein the device is a termination device.

12. An apparatus for automatically mapping a tape library system, the apparatus comprising:
    a plurality of software modules, the plurality of software modules comprising:
    a communication module configured to establish communication with a device within an unidentified frame in a tape library system, the unidentified frame having a Media Access Control ("MAC") address associated therewith, the unidentified frame comprising a hardware frame holding one or more devices in one or more physical slots,
    an identification module configured to distinguish the unidentified frame by sequentially determining characteristics of devices held in the unidentified frame until characteristics are determined that distinguish the unidentified frame from other frames in the tape library system, the characteristics comprising characteristics that facilitate frame identification including a type of devices held in the unidentified frame and a quantity of devices held in the unidentified frame, and
    an IP address assignment module configured to associate a persistent IP address with the MAC address in response to distinguishing the unidentified frame; and
    a processor configured to execute the plurality of software modules.

13. The apparatus of claim 11, wherein the characteristics comprise a physical location of the device in the tape library.

14. The apparatus of claim 11, wherein the characteristics comprise a device model number.

15. The apparatus of claim 11, wherein the characteristics comprise a device type.

16. The apparatus of claim 11, wherein the characteristics comprise a device quantity.

17. The apparatus of claim 11, wherein the IP address assignment module is further configured to associate a temporary IP address with the frame.

18. The apparatus of claim 11, wherein the MAC address is the MAC address of the hub.

19. The apparatus of claim 11, wherein the device is a tape drive.

20. The apparatus of claim 11, wherein the device is a termination device.

21. A system for automatically mapping a tape library system, the system comprising:
    a library manager configured to establish communication with a device within an unidentified frame in a tape library system, the unidentified frame having a Media Access Control ("MAC") address associated therewith, the unidentified frame comprising a hardware frame holding one or more devices in one or more physical slots;
    the library manager configured to distinguish the unidentified frame by sequentially determining characteristics of devices held in the unidentified frame until characteristics are determined that distinguish the unidentified frame from other frames in the tape library system, the characteristics comprising characteristics that facilitate frame identification including a type of devices held in the unidentified frame and a quantity of devices held in the unidentified frame;
    the library manager further configured to associate a persistent IP address with the MAC address in response to distinguishing the unidentified frame;
    a robotic device configured to mount a cartridge in a drive; and
    a DHCP server configured to assign IP addresses to a switching device.

22. The system of claim 21, wherein the characteristics are selected from the group consisting of a device model number, a device type, a device quantity, and a physical location of the device within the unidentified frame.

* * * * *